(12) United States Patent
Venkataswami et al.

(10) Patent No.: US 8,560,651 B2
(45) Date of Patent: Oct. 15, 2013

(54) METHOD AND SYSTEM FOR STREAMING USER-CUSTOMIZED INFORMATION

(75) Inventors: Balaji Venkat Venkataswami, Chennai (IN); Mahesh Vittal, Chennai (IN); Srinivasan Santhanam, Chennai (IN); Ganesan Velrajan, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1515 days.

(21) Appl. No.: 11/369,632

(22) Filed: Mar. 7, 2006

(65) Prior Publication Data
US 2007/0214246 A1 Sep. 13, 2007

(51) Int. Cl.
*G06F 15/173* (2006.01)
*G06F 15/16* (2006.01)

(52) U.S. Cl.
USPC ............ 709/223; 709/238; 709/232; 709/230

(58) Field of Classification Search
USPC ........................................................ 709/223
See application file for complete search history.

(56) References Cited

U.S. PATENT DOCUMENTS

| | | | | |
|---|---|---|---|---|
| 5,544,161 | A * | 8/1996 | Bigham et al. | 370/397 |
| 6,567,854 | B1 * | 5/2003 | Olshansky et al. | 709/229 |
| 7,080,157 | B2 * | 7/2006 | McCanne | 709/238 |
| 7,281,058 | B1 * | 10/2007 | Shepherd et al. | 709/238 |
| 7,801,480 | B2 * | 9/2010 | Becker | 455/3.06 |
| 2002/0067730 | A1 * | 6/2002 | Hinderks et al. | 370/395.52 |
| 2003/0073453 | A1 * | 4/2003 | Basilier | 455/503 |
| 2003/0088696 | A1 * | 5/2003 | McCanne | 709/238 |
| 2003/0123453 | A1 * | 7/2003 | Ooghe et al. | 370/395.53 |
| 2003/0135644 | A1 * | 7/2003 | Barrett | 709/238 |
| 2003/0165140 | A1 * | 9/2003 | Tang et al. | 370/393 |
| 2003/0202124 | A1 * | 10/2003 | Alden | 348/722 |
| 2004/0010616 | A1 * | 1/2004 | McCanne | 709/238 |
| 2005/0022253 | A1 * | 1/2005 | Chen et al. | 725/135 |
| 2005/0076207 | A1 * | 4/2005 | Park et al. | 713/163 |
| 2006/0147204 | A1 * | 7/2006 | Yasukawa et al. | 398/26 |
| 2006/0187950 | A1 * | 8/2006 | Bou-Diab et al. | 370/432 |
| 2007/0081459 | A1 * | 4/2007 | Segel et al. | 370/230 |
| 2007/0110024 | A1 * | 5/2007 | Meier | 370/351 |
| 2008/0102749 | A1 * | 5/2008 | Becker | 455/3.06 |
| 2008/0212583 | A1 * | 9/2008 | Rey et al. | 370/390 |
| 2008/0293428 | A1 * | 11/2008 | Rey et al. | 455/452.2 |

OTHER PUBLICATIONS

A.Khunger, Inserting Advertisements in IP Multicast, Internet Engineering Task Force (IETF), Sep. 1, 2005.

* cited by examiner

*Primary Examiner* — Richard G Keehn
(74) *Attorney, Agent, or Firm* — Fish & Richardson P.C.

(57) ABSTRACT

Methods, systems and apparatus are provided for a service provider to stream user-customized information. In an embodiment, the user-customized information includes tickers, advertisements and other types of user-specific information. Users can register for categories that interest them, from an available set of categories. The service provider can then stream the user-customized information on the basis of registration information. A parent service provider streams a main event and gives the service provider control of streaming the user-customized information during still periods of the main event. The service provider can also stream tickers, based on the registered categories, during the main event.

18 Claims, 7 Drawing Sheets

METHOD AND SYSTEM FOR STREAMING USER-CUSTOMIZED INFORMATION

BACKGROUND OF THE PRESENT INVENTION

1. Field of Present invention

Embodiments of the present invention relate, in general, to multicast streaming in a network. More specifically, embodiments of the present invention relate to methods and systems for streaming user-customized information to users.

2. Description of the Background Art

Data streaming is a method of transmitting data in a steady and continuous stream of packets from a source to a destination in a network. The stream of packets can include audio data, video data, or a combination thereof. Data streaming transmits data in a compressed form over the network. Further, the transmitted data is played as soon as it arrives at the destination. There are two types of data streaming: unicast streaming and multicast streaming. Multicast streaming enables the transmission of identical data to more than one destination in the network. The Internet Group Management Protocol (IGMP) is a communication protocol that is involved in the process of multicast streaming in the network by managing the membership of Internet Protocol multicast groups. In the past, multicast streaming did not include advertisements while transferring a main event to the multicast groups. However, with the introduction of new technologies, a multicast stream includes advertisements along with the main event. The advertisements can be inserted in advertisement slots, which are decided by a primary service provider of the main data. Two types of advertisement slots can be included in the multicast stream. In the first type, the primary service provider of data inserts the advertisements in the advertisement slots. All the members of the multicast group connected to the primary service provider receive these advertisements.

Secondary service providers, such as regional service providers, use the second type of advertisement slots to insert advertisements. In this case, the primary service provider informs a secondary service provider about the advertisement slots by sending an Ad-insert control packet, which includes an Ad-insert message. The Ad-insert message specifies periods when the secondary service provider can take control of streaming from the primary service provider. Therefore, the secondary service provider can utilize the specified periods to insert its advertisements and send them to the multicast group. However, a user does not have a say in the type of the advertisements, tickers and messages that are inserted in the multicast stream.

DETAILED DESCRIPTION OF EMBODIMENTS OF THE PRESENT INVENTION

Embodiments of the present invention provide methods, systems, and computer-readable media for a service provider in a network to stream user-customized information. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
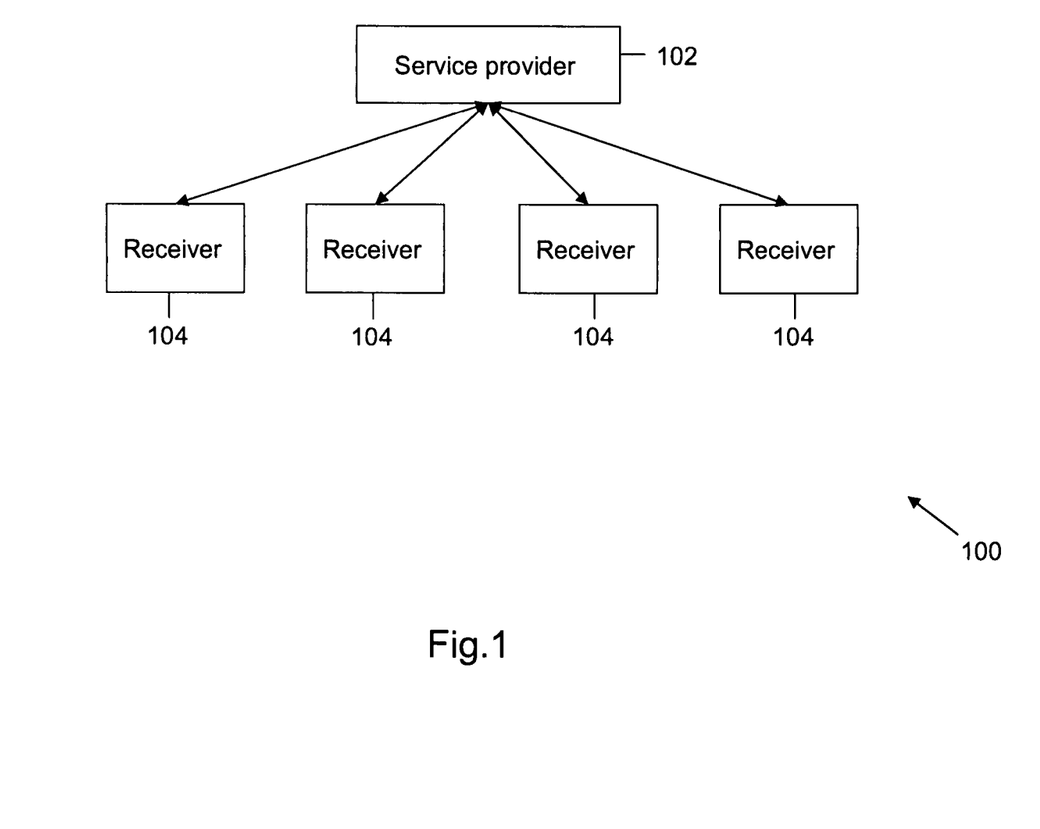
FIG. 1 illustrates an environment wherein embodiments of the present invention can be performed.

Referring now to drawings, more specifically by reference numbers, FIG. 1 illustrates environment 100, wherein embodiments of the present invention can be performed. Service provider 102 sends a multicast stream of a main event to a plurality of receivers 104. Examples of service provider 102 include, but are not limited to, international, national, and regional streamers. For example, service provider 102 acts as a source of a live Super Bowl match to receivers 104. For the purpose of this example, the live Super Bowl match is considered the main event for users who receive information from receivers 104. However, there can be periods, hereinafter referred as still periods, when service provider 102 does not need to stream the main event. For example, service provider 102 will not stream the live Super Bowl match during a break in the match. During this time, service provider 102 can stream advertisements, tickers and other messages to users. A ticker is, for example, a scrolling piece of text or an image that can be hyperlinked to another site. The scrolling piece of text or image is shown as a scrolling electronic display on a screen.

Embodiments of the present invention provide a method and a system for streaming advertisements, tickers or messages, hereinafter collectively referred as user-customized information, on the basis of categories requested by users. For this purpose, users are provided with an available set of categories on which they would like to receive the user-customized information from service provider 102. The available set of categories is the list of categories on which service provider 102 can stream the user-customized information to users. For example, the categories can be 'sports', 'weather', 'regional information', and 'language'. Accordingly, if a user registers for receiving information related to sports, the user-customized information will include information related to sports. This can be advertisements, messages or tickers related to sports. The user-customized information can also include content such as still images, audio, computer generated graphics and animation, etc.

Further, the user can use the language category, to select the language on which the user would like to receive the user-customized information. For example, the user can choose that the user-customized information should be streamed in English. Accordingly, users can register for categories that interest them. Receivers 104 receive this registration information from the users. In an embodiment of the present invention, a user located in a particular geographical region can register to receive the user-customized information relating to the particular geographical region, such as information regarding the weather in that region.

Further, the registration information forms a basis for building a multicast distribution tree for streaming the user-customized information from service provider 102. Service provider 102 acts as a source of the multicast distribution tree, for streaming the user-customized information.

Figure 2:
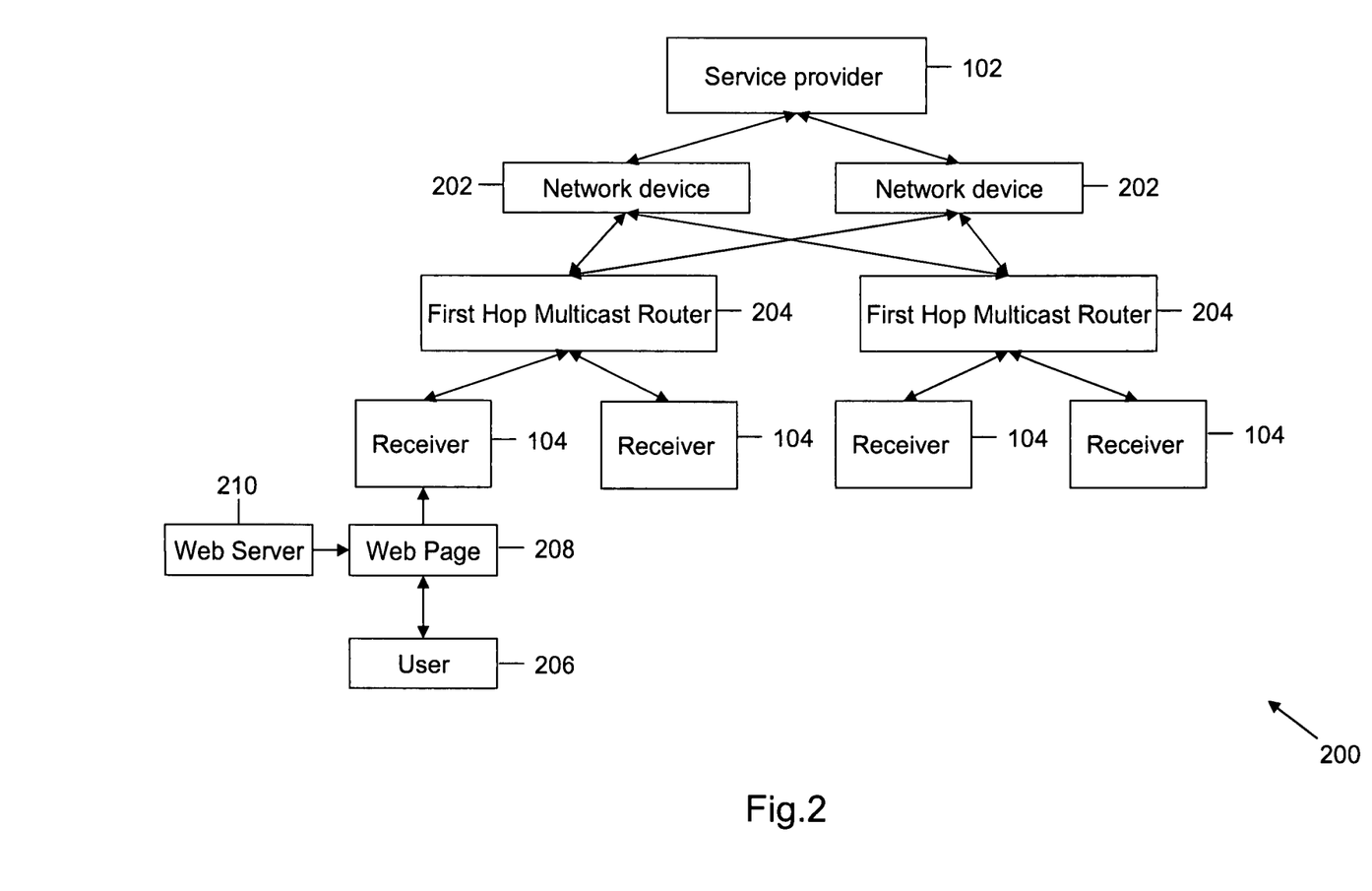
FIG. 2 illustrates a multicast distribution tree, in accordance with embodiments of the present invention.

FIG. 2 illustrates multicast distribution tree 200 in accordance with an embodiment of the present invention. In an embodiment of the invention, receivers 104 are connected to a plurality of users 206. Users 206 are provided with web page 208 by web server 210. Web page 208 includes information that links to information that can be provided to users 206 in the form of a multicast stream. For example, web page 208 can include URL that includes information based on different categories. Web page 208 provides users 206 information regarding different categories on which users 206 can receive user-customized information from service provider 102. Users 206 can register for the categories of interest in web page 208. The registration information, as selected by users 206 is received by receivers 104. This includes information regarding the categories selected in web page 208 by users 206. Receivers 104 can also keep a track of users 206 characteristics such as user profile along with the interested categories.

Receivers 104 are connected to FHMRs 204. Each FHMR is a router that is directly connected to receivers 104. FHMRs 204 are connected to a network cloud. Plurality of network devices 202 forms a network cloud for transmitting data through different layers, wherein each layer includes some network devices 202. Examples of network devices 202 include, but are not limited to, routers, bridges and switches. This network cloud is connected to service provider 102. These connections between service provider 102 and receiver 104 forms multicast distribution tree 200. Multicast distribution tree 200 is formed on the basis of the categories selected by users 206 registration information. Service provider 102 streams the user-customized information through multicast distribution tree 200 to receivers 104 that provide the user-customized information to users 206.

In an embodiment of the present invention, service provider 102 multicasts the user-customized information to users 206 through multicast distribution tree 200 that is built on the basis of the registration information from users 206.

In an embodiment of the invention, the stream of the user-customized information can originate at network devices 202, receiver 104, FHMR 204, or any other device or entity. In an embodiment of the invention, a network device from network devices 202 can be a source of the user-customized information and can be referred as a secondary service provider of the user-customized information to users 206.

Figure 3:
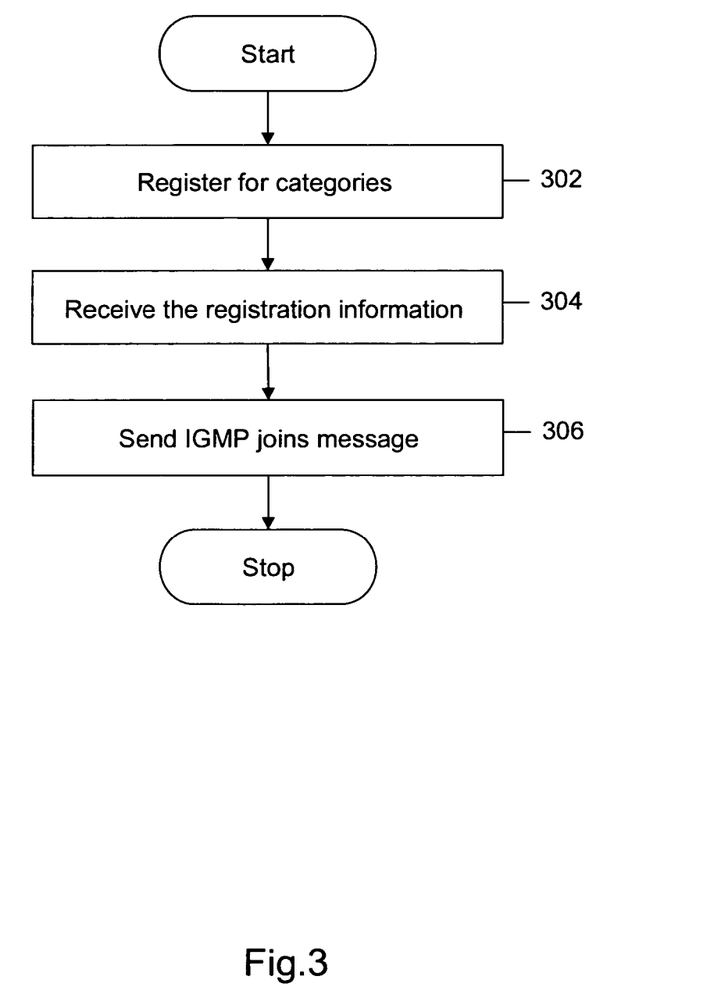
FIG. 3 is a flowchart illustrating a method to handle the registration information in accordance with an embodiment of the invention.

FIG. 3 is a flowchart illustrating a method to handle the registration information by receivers 104 in accordance with an embodiment of the invention. At step 302, users 206 select the categories on which they would like to receive information from service provider 102 by selecting the categories on web page 208. In an embodiment of the present invention, users 206 register for the categories that interest them before receiving the main event. In another embodiment of the present invention, users 206 can register for the categories that interest them during the main event. When a user from users 206 selects the categories on web page 208, the appropriate multicast group registration is performed based on the selected categories. At step 304, receivers 104 receive the registration information from users 206. Further at step 306, receivers 104 sends Internet Group Management Protocol (IGMP) join messages to FHMRs 204 for the multicast groups that are registered for the selected categories.

Figure 4:
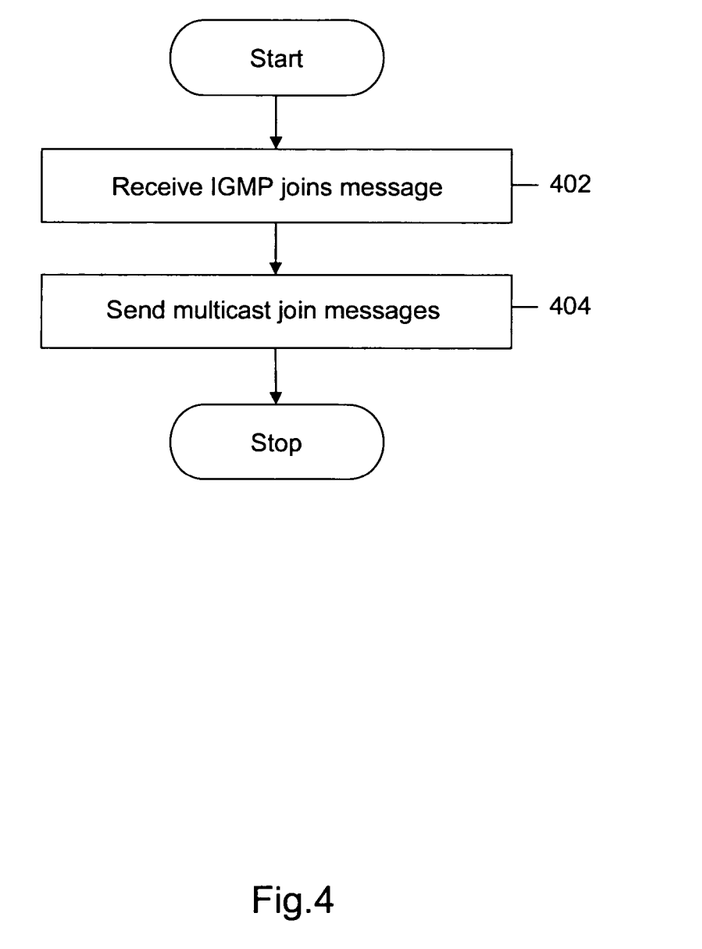
FIG. 4 is a flowchart illustrating a method to build a multicast distribution tree, in accordance with an embodiment of the present invention.

FIG. 4 is a flowchart illustrating a method to build multicast distribution tree 200 using the IGMP join messages for streaming the user-customized information, in accordance an embodiment of the present invention. At step 402, each FHMR from FHMRs 204 receives the IGMP join messages from corresponding receivers 104 for the multicast groups that are registered for the selected categories. Each FHMR has information about the multicast groups that map to the registered categories. Each multicast group is identified by a unique multicast group address, and each category from the available set of categories is mapped to a unique multicast group address.

In an embodiment of the present invention, the number of categories in the available set of categories can be greater than the number of available multicast group addresses. In this event, a FHMR from FHMRs 204 can map more than one registered category to a multicast group address. This may result in a combined stream of the user-customized information from the mapped multicast groups to receivers 104. The combined stream includes the user-customized information corresponding to more than one registered category. The combined stream also includes appropriate control information about the starting and ending of the streaming of the user-customized information of each registered category. The control information can be carried in the form of a control word in a payload of the combined stream. The control word refers to supplementary data that includes necessary information for controlling the combined stream.

At step 404, each FHMR sends multicast join messages for the mapped multicast groups towards service provider 102. For example, FHMRs 204 send Protocol Independent Multicast Sparse Mode (PIM SM) join messages towards service provider 102. The direction of PIM SM join messages is from FHMRs 204 towards service provider 102 via the network cloud.

In an embodiment of the present invention, FHMRs 204 update the registration information, if a user from users 206 adds or drops a category by revisiting the registration process. The configuration of multicast distribution tree 200 is then changed on the basis of the updated registration information.

In an embodiment of the present invention, if the user does not want to receive information related to a category, then the user can make a request for not receiving the user-customized information related to that category. For example, the user can make a request to not receive advertisements for adult sites. These advertisements are blocked by maintaining appropriate configuration and filtering at FHMRs 204.

Figure 5:
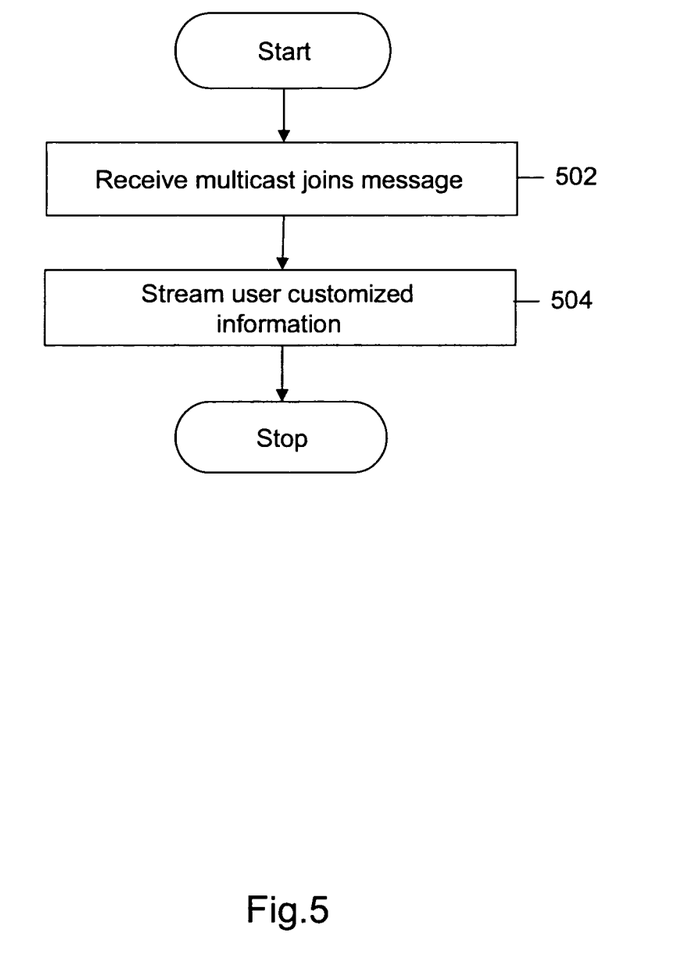
FIG. 5 is a flowchart illustrating a method to stream user-customized information, in accordance with various embodiments of the invention.

FIG. 5 is a flowchart illustrating a method for streaming the user-customized information by service provider 102 to receivers 104, in accordance with an embodiment of the present invention. As described earlier, service provider 102 receives the multicast join messages from FHMRs 204 through network devices 202, at step 502. Multicast distribution tree 200 is built by joining service provider 102 to the network cloud on the basis of the received multicast join messages. Further the network cloud is connected to corresponding FHMRs 204. In this way, multicast distribution tree 200 is formed from service provider 102 to receivers 104 on the basis of the received join messages.

In an embodiment of the present invention, service provider 102 sends a stream of data to network cloud. The stream of data includes information related to categories registered by users 206. The network cloud forwards the stream of data to multicast groups that map to the registered categories. Therefore, each mapped multicast group receives information on the corresponding category from the network cloud. Each FHMR from FHMRs 204 receives the user-customized information from the network cloud and multicasts the received information to connected receivers 104. FHMRs 204 may lie in different geographical regions with respect to service provider 102. In this way, service provider 102 multicasts the user-customized information to users 206 present in different geographical regions with respect to service provider 102.

In an embodiment of the present invention, service provider 102 streams advertisements and tickers, based on the registered categories, during the still periods, through multicast distribution tree 200. In another embodiment of the present invention, service provider 102 streams tickers, based on the registered categories, along with the main event, through multicast distribution tree 200.

In an embodiment of the present invention, service provider 102 can also stream certain categories of advertisements, tickers and messages that are not requested by users 206. Such categories are referred as default categories. The default categories are set by a system administrator of service provider 102. Therefore, a user can also receive the information on a category that is not registered by the user. In an embodiment of the present invention, the user receives information, based on the registered categories, more often than the information based on the default categories.

Figure 6:
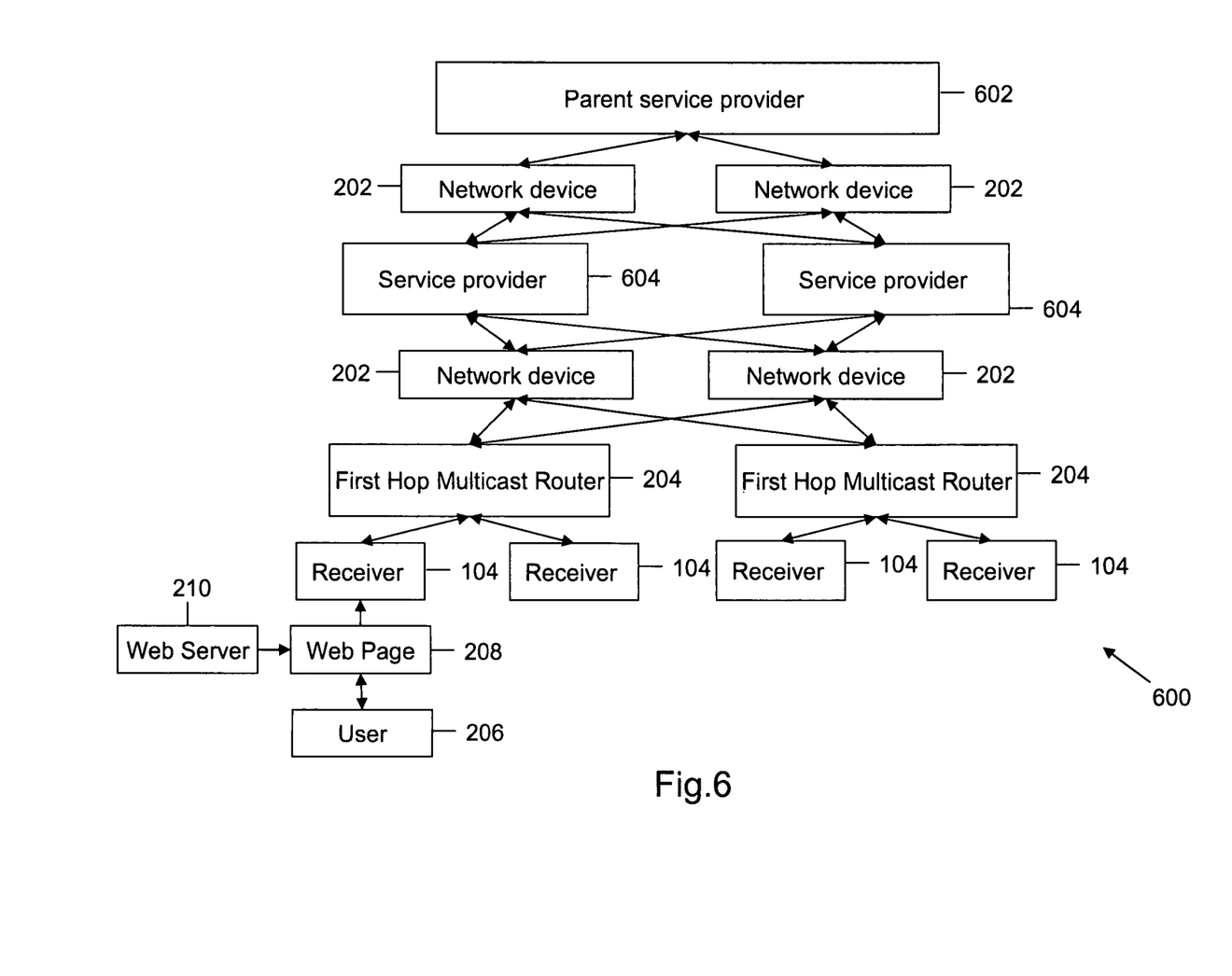
FIG. 6 illustrates an environment wherein an embodiment of the present invention can be performed.

FIG. 6 illustrates environment 600 wherein an embodiment of the present invention can be performed. Parent service provider 602 can be connected to plurality of service providers 604. Parent service provider 602 streams a main event to receivers 104 through a main multicast distribution tree. The main multicast distribution tree includes network devices 202, service providers 604, FHMRs 204 and receivers 104 and users 206. Examples of parent service provider 602 include, but are not limited to, international, national and regional streamers. For example, parent service provider 602 is a national streamer and service providers 604 are regional streamers. Parent service provider 602 can transfer control of streaming to service providers 604 during the still periods. In an embodiment of the present invention, service providers 604 utilize the still periods to stream the user-customized information to receivers 104.

In an embodiment of the present invention, a service provider from service providers 604 can receive the main event for streaming from parent service provider 602. In this case, multicast distribution tree 200 is a part of the main multicast distribution tree. Therefore, the service provider can act as a router in the main multicast distribution tree through which the main event is transmitted. In another embodiment of the present invention, multicast distribution tree 200 can be disjoint from the main multicast distribution tree. However in both the cases, the service provider from service provider 604 acts as a source for streaming the user-customized information to users 206. Multicast distribution tree 200, with the service provider as the source, is built on the basis of the registration information received from users 206.

If multicast distribution tree 200 is a part of the main multicast distribution tree for the main event, then the service provider can add the tickers, based on the registered categories to the main event. The tickers can be added to the main event when the service provider receives the main event for streaming. If multicast distribution tree 200 is not a part of the main multicast distribution tree, then the service provider streams the tickers to users 206 separately through multicast distribution tree 200. In an embodiment of the present invention, the service provider streams the tickers that provide information specific to a region corresponding to the service provider. For example, the service provider can add tickers on weather information pertaining to the region corresponding to the service provider.

In another embodiment of the present invention, parent service provider 602 informs the service provider about the still periods of the main event. This information c a n be provided in the form of an Ad-insert control packet. Further, the service provider takes over control of the streaming from parent service provider 602, based on the Ad-insert control packet. The Ad-insert control packet includes information about various parameters related to taking control of streaming from parent service provider 602. The Ad-insert control packet also includes details regarding the timings and the duration of the still periods. Further, the service provider streams the user-customized information in the form of advertisements, tickers and messages during the still periods of the main event.

Figure 7:
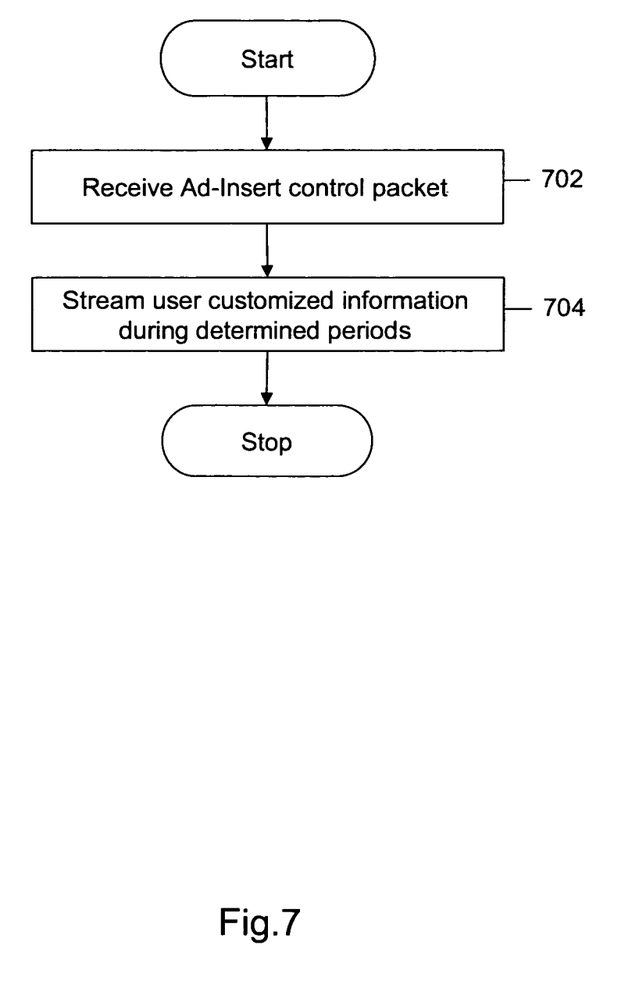
FIG. 7 is a flowchart illustrating a method to stream the user-customized information, in accordance with another embodiment of the present invention.

FIG. 7 is a flowchart illustrating a method for streaming the user-customized information during the still periods of the main event, in accordance with an embodiment of the present invention. At step 702, the service provider receives the Ad-insert control packet from parent service provider 602. Parent service provider 602 sends the Ad-insert control packet to the service provider when parent service provider 602 wants to transfer control of streaming to the service provider. At step 704, the service provider streams the user-customized information during periods determined on the basis of the Ad-insert control packet. The Ad-insert control packet includes information indicating the time to start streaming the user-customized information. This information is denoted by fields such as 'immediate play' or 'play at a time instant'. If the Ad-insert control packet includes 'immediate play', then the service provider starts streaming the user-customized information as soon as it receives the Ad-insert control packet. If the Ad-insert control packet includes 'play at a time instant', then the service provider streams the user-customized information at the time instructed by the Ad-insert control packet. This time is specified in a time record that is included in the Ad-insert control packet.

Embodiments of the present invention facilitate the streaming of the user-customized information by parent service provider 602, service providers 604 and service provider 102 during the still periods of the main event.

Embodiments of the present invention facilitate the streaming of the tickers, based on the registered categories. The tickers are streamed to receivers 104 by service provider 102 and service providers 604 along with the main event or during the still periods.

Embodiments of the present invention facilitate the provision of full control of streaming of the user-customized information to service providers 604, resulting in the provision of more flexibility to service providers 604 to manage the process of streaming the user-customized information.

Embodiments of the present invention facilitate rebuilding multicast distribution tree 200 if a user updates the registration information.

Embodiments of the present invention facilitate the streaming of the user-customized information in a language specified by a user.

Embodiments of the present invention facilitate blocking the streaming of the user-customized information for a category specified by a user.

Embodiments of the present invention facilitate the provision of low bandwidth requirements for streaming the user-customized information from service providers 604, as compared to streaming it from parent service provider 602. This is possible since streaming of tickers, advertisements and other short-duration messages require less bandwidth, as compared to the bandwidth required for streaming the main event.

Embodiments of the present invention facilitate reduced delay and jitter for the user-customized information being streamed by service providers 604, because the height of multicast distribution tree 200 with service providers 604 as a source is less, as compared to the height of multicast distribution tree 200 with parent service provider 602 as a source. Further, streaming from service providers 604 takes less time, as compared to the time taken for streaming from parent service provider 602.

According to embodiments of the present invention, a method for streaming user-customized information by a service provider is provided. The method comprising receiving multicast joins messages from First Hop Multicast Routers (FHMRs) through network devices, the received multicast join messages are based on categories registered by users; and streaming user-customized information through a multicast distribution tree, the multicast distribution tree is built on the basis of the received multicast join messages.

In an embodiment of the present invention, a system for streaming user-customized information is provided. The system comprising a plurality of receivers adapted to receive the information of registered categories from users and adapted to send Internet Group Management Protocol (IGMP) join messages, the IGMP join messages are based on registration information; a plurality of first hop multicast routers (FHMR), each of the plurality of the FHMRs coupled to the plurality of receivers, adapted to receive the IGMP join messages from the plurality of receivers and adapted to send multicast join messages on the basis of the received IGMP join messages; a plurality of network devices adapted to receive the multicast join messages from the FHMR and adapted to send the multicast join messages; and a service provider adapted to receive the multicast join messages from the plurality of network devices, and adapted to stream the user-customized information to the plurality of receivers through the multicast distribution tree, the multicast distribution tree is built on the basis of the received multicast join messages.

In an embodiment of the present invention, a system for streaming user-customized information is provided. The system comprises a means for receiving multicast join messages from First Hop Multicast Routers (FHMRs) through network devices, the received multicast join messages are based on categories registered by users; and means for streaming user-customized information through a multicast distribution tree, the multicast distribution tree is built on the basis of the received multicast join messages.

Although specific protocols, such as IGMP, have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the present invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the present invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims

What is claimed is:

1. A method for streaming one or more user-customized advertisements by a service provider, the method comprising:
   receiving, by a service provider, an Ad-insert control packet from a parent service provider, wherein the Ad-insert control packet contains information identifying one or more periods during which control of streaming will be transferred from the parent service provider to the service provider; and
   streaming, by the service provider, one or more user-customized advertisements during one or more periods that are determined on the basis of the Ad-insert control packet, wherein the one or more user-customized advertisements are customized to one or more users on the basis of one or more subject matter categories that have been selected by one or more users, and wherein the user-customized advertisements are streamed through a first multicast distribution tree, the first multicast distribution tree being formed on the basis of the one or more subject matter categories selected by the one or more users, and wherein the first multicast distribution tree is part of a second multicast distribution tree that is used by the parent service provider to stream a main content into which the user-customized advertisements are to be inserted.

2. The method of claim 1, further comprising streaming tickers related to the one or more subject matter categories selected by the one or more users.

3. The method of claim 1, further comprising streaming in a language specified by the one or more users.

4. The method of claim 1, further comprising:
   blocking the streaming of one or more user-customized advertisements related to a subject matter category selected by the one or more users.

5. The method of claim 1, further comprising:
   streaming default information.

6. The method of claim 1, wherein the one or more subject matter categories specify subject matter to which the one or more user-customized advertisements relate, and wherein at least one of the one or more subject matter categories is a sports category.

7. The method of claim 1, wherein the one or more subject matter categories specify subject matter to which the one or more user-customized advertisements relate, and wherein at least one of the one or more subject matter categories is a weather category.

8. The method of claim 1, wherein the one or more subject matter categories specify subject matter to which the one or more user-customized advertisements relate, and wherein at least one of the one or more subject matter categories is a regional information category.

9. The method of claim 1, wherein the one or more subject matter categories specify subject matter to which the one or more user-customized advertisements relate, and wherein at least one of the one or more subject matter categories is a language category.

10. The method of claim 1, further comprising receiving multicast join messages from First Hop Multicast Routers (FHMRs) through network devices, wherein the received multicast join messages are derived from the subject matter categories selected by the one or more users.

11. The method of claim 1, further comprising:
    reforming the first multicast distribution tree in response to a change in the one or more subject matter categories selected by the one or more users.

12. The method of claim 11, further comprising:
streaming user-customized advertisements relating to more than one subject matter category selected by the one or more users when the number of categories is greater than a number of multicast addresses.

13. The method of claim 1 wherein the one or more users select the one or more subject matter categories using a web page.

14. The method of claim 13 wherein the one or more subject matter categories selected by the one or more users are received by at least one receiver.

15. The method of claim 14 wherein the web page is coupled to the receiver.

16. The method of claim 15 wherein the receiver is coupled to at least one First Hop Multicast Router (FHMR).

17. A system for streaming one or more user-customized advertisements, the system comprising:
a parent service provider adapted to send an Ad-insert control packet to one or more service providers; and
a service provider adapted to:
receive the Ad-insert control packet from the parent service provider, wherein the Ad-insert control packet contains information identifying one or more periods during which control of streaming will be transferred from the parent service provider to the service provider, and
stream one or more user-customized advertisements during one or more periods that are determined on the basis of the Ad-insert control packet, wherein the one or more user-customized advertisements are customized to one or more users on the basis of one or more subject matter categories that have been selected by the one or more users, and wherein the user-customized advertisements are streamed through a first multicast distribution tree, the first multicast distribution tree being formed on the basis of the one or more subject matter categories selected by the one or more users, and wherein the first multicast distribution tree is part of a second multicast distribution tree that is used by the parent service provider to stream a main content into which the user-customized advertisements are to be inserted.

18. A non-transitory computer-readable medium encoded with a computer program, the program comprising instructions that when executed by one or more computers cause the one or more computers to perform operations comprising:
receiving, by a service provider, an Ad-insert control packet from a parent service provider, wherein the Ad-insert control packet contains information identifying one or more periods during which control of streaming will be transferred from the parent service provider to the service provider, and
streaming, by the service provider, one or more user-customized advertisements during one or more periods that are determined on the basis of the Ad-insert control packet, wherein the one or more user-customized advertisements are customized to one or more users on the basis of one or more subject matter categories that have been selected by the one or more users, and wherein the user-customized advertisements are streamed through a first multicast distribution tree, the first multicast distribution tree being formed on the basis of the one or more subject matter categories selected by the one or more users, and wherein the first multicast distribution tree is part of a second multicast distribution tree that is used by the parent service provider to stream a main content into which the user-customized advertisements are to be inserted.

* * * * *